United States Patent [19]

Kowalczik et al.

[11] Patent Number: 5,144,002
[45] Date of Patent: Sep. 1, 1992

[54] THERMOPLASTIC MOLDING COMPOUND BASED ON MODIFIED CO-POLYPHENYLENE ETHER

[75] Inventors: Udo Kowalczik, Bochum; Wolfgang Neugebauer, Duelmen; Martin Bartmann, Recklinghausen, all of Fed. Rep. of Germany

[73] Assignee: Huels Aktiengesellschaft, Marl, Fed. Rep. of Germany

[21] Appl. No.: 570,887

[22] Filed: Aug. 22, 1990

[30] Foreign Application Priority Data

Sep. 20, 1989 [DE] Fed. Rep. of Germany ....... 3931332

[51] Int. Cl.$^5$ ............................................. C08G 65/38
[52] U.S. Cl. ..................................... 528/218; 525/50; 525/390; 525/391
[58] Field of Search ......................................... 528/218

[56] References Cited

U.S. PATENT DOCUMENTS 3,422,062 1/1969 Segal et al. .......................... 528/218
3,733,307 5/1973 Cooper ................................ 528/218

Primary Examiner—Harold D. Anderson
Attorney, Agent, or Firm—Oblon, Spivak, McClelland, Maier & Neustadt

[57] ABSTRACT

Molding compounds that contain polyphenylene ethers which have been prepared from comonomers consisting of phenols substituted with benzyl groups exhibit improved mechanical properties, for example impact strength. Such molding compounds are useful for the production of industrial items such as pipes, panels or cases.

8 Claims, No Drawings

THERMOPLASTIC MOLDING COMPOUND BASED ON MODIFIED CO-POLYPHENYLENE ETHER

BACKGROUND OF THE INVENTION

1. Field of the Invention

The present invention relates to thermoplastic molding compounds with improved mechanical properties based on modified polyphenylene ethers.

2. Discussion of the Background

Polyphenylene ethers (PPE) are technical high-performance thermoplastics with high melt viscosities and softening points. They are used especially when resistance to high temperatures is important (see, e.g., U.S. Pat. Nos. 3,306,874, 3,306,875, 3,257,357, and 3,257,358). Of course, shaped parts made of pure polyphenylene ethers are brittle because of their poor impact strength, and their solvent resistance is unsatisfactory. Therefore, blends of polyphenylene ethers with other thermoplastics are ordinarily used.

DE-OS 35 18 277, for example, describes thermoplastic molding compounds based on polyphenylene ethers and polyoctenylene that are distinguished by high impact strength, outstanding high-temperature dimensional stability, and good processibility.

In contrast to these and similar alloys with an amorphous matrix, blends with polyamides have very good solvent resistance. However, as a rule, of course, brittle products are obtained, since the two components are incompatible (DE-OS 16 94 290 and 30 27 104). It is attempted in EP-OS 0 024 120 to achieve some compatibility by adding a third component such as a liquid diene polymer, an epoxide, or a compound with a double or triple bond and a functional group. However, the toughness of the resin compounds obtained is not sufficient for many applications. Better compatibility of the two phases is obtained by functionalizing the polyphenylene ether, for example with maleic anhydride, optionally together with other substances with synergistic action (for example, see EP-OS 0 232 363, DE-OS 36 15 393, DE-OS 36 21 805, and Japanese Patent Application Kokai 66,452/984). Because of the volatility and toxicity of maleic anhydride, extensive protective equipment is necessary in this case to exclude endangering the personnel or exposing them to a great extent.

Another starting point for introducing compatibility between polyphenylene ethers and other polymers consists of incorporating reactive sites in the polyphenylene ether even in the stage of oxidative coupling by adding suitable functionalized comonomers, which can react with other polymers when blended with it.

For example, a substituted aminomethylphenol is incorporated during the preparation of polyphenylene ethers in U.S. Pat. No. 4,129,555. The incorporated aminomethyl groups are intended to have the effect that blends of this polyphenylene ether with polystyrene resins will possess better impact strength.

It is shown in EP-OS 0 338 209 that a polyphenylene ether with terminal functional groups such as oxazolinyl, amide, ester, imide, or carbonyl have good compatibility with polyamides. The reaction of the functional groups with polyamide end groups can be assumed to be the reason for this.

However, it is a drawback of these previously known polyphenylene ether copolymers that they are effective only in combination with a limited number of blend components. Furthermore, the necessary comonomers are sometimes very difficult to obtain.

Although the preparation of modified polyphenylene ethers by copolycondensation, for example of 2,6-dimethylphenol with 2-methyl-6-alkylphenols, is disclosed in U.S. Pat. Nos. 3,306,874 and 3,306,875 and DE-OS 29 17 819, there is no indication to one skilled in the art either from these references or from the state of the art that the molding compounds prepared from them might have any advantages over the previously known molding compounds based on ordinary polyphenylene ethers.

Thus, there remains a need for thermoplastic molding compounds based on modified polyphenylene ethers which possess improved mechanical properties.

SUMMARY OF THE INVENTION

Accordingly, it is an object of the present invention to provide thermoplastic molding compounds based on modified polyphenylene ethers which possess improved mechanical properties.

It is another object of the present invention to provide molded objects which are prepared by molding such molding compounds.

These and other objects, which will become apparent during the course of the following detailed description, have been achieved by the inventors' discovery that thermoplastic molding compounds which contain certain modified polyphenylene ethers have distinctly better mechanical properties than molding compounds based on unmodified polyphenylene ethers.

DETAILED DESCRIPTION OF THE PREFERRED EMBODIMENTS

The modified polyphenylene ethers of the present invention may be prepared by oxidative coupling of phenols of the general Formula I,

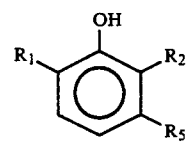

in which $R_1$ and $R_2$ stand for alkyl with 1 to 6 carbon atoms or phenyl, or $R_1$ stands for t-butyl, and $R_2$ stands for H and $R_5$ stands for alkyl with 1 to 6 carbon atoms or preferably H, with comonomers of the general Formula II,

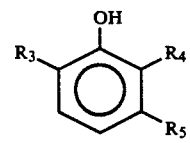

in which $R_3$ is the same as $R_1$ or optionally substituted benzyl, $R_4$ stands for optionally substituted benzyl, and the optionally substituted benzyl group has 7 to 12 carbon atoms, and $R_5$ is as defined above.

Preferred as phenols of Formula I are 2,3,6-trimethylphenol and especially 2,6-dimethylphenol; suitable phenols of Formula II are especially 2-benzyl-6-methylphenol and 2,6-dibenzylphenol. These can be prepared in a simple way by known methods, for example, by alkylation of phenols with benzyl alcohol in the gas phase with a fixed-bed catalyst, for example, according to DE-OS 21 36 602 or 24 28 056, or EP-OS 0 019 476.

It is preferred here to use 99.8 to 80 mole % of the phenols of Formula I and 0.2 to 20 mole % of the phenols of Formula II. It is particularly preferred to use 99 to 80 mole of the phenol of Formula I and 1 to 10 mole % of the phenol of Formula II.

The modified polyphenylene ether preferably has a viscosity number, J, measured according to DIN 53 728 at 25° C. in chloroform (concentration 5 g/1) in the range of 20–80 cm$^3$/g, (particularly preferably 30–70 cm$^3$/g) and these polyphenylene ethers can be prepared by any conventional procedure. Ordinarily, this is done by oxidation of the phenol mixture with a gas containing oxygen, for example, air, in the presence of a copper-amine catalyst (see, e.g., DE-OS 32 24 692, DE-OS 32 24 691, U.S. Pat. No. 3,306,874, and U.S. Pat. No. 3,306,875).

The blends of these modified polyphenylene ethers with other polymers to prepare thermoplastic molding compounds leads to products with distinctly better mechanical properties than comparable molding compounds prepared with unmodified polyphenylene ethers.

Improved mechanical properties are obtained especially with the following blends.

I. Modified polyphenylene ethers with polymers that improve impact strength, for example, high-impact polystyrene, styrene-butadiene rubber (statistical, grafted, and block copolymers, including hydrogenated polymers), ethylene-propylene copolymers, ethylene-propylene-diene terpolymers, polypentenylene, polyoctenylene, or mixtures of them. The impact-strength modifiers can be functionalized in accordance with the state of the art (for example, see U.S. Pat. Nos. 3,236,917, 3,862,265, 3,873,643, 3,882,194, and 4,026,967, and DE-OS 22 16 718, 24 01 149, and 21 08 749), for example by reaction with maleic anhydride or fumaric esters. Additionally, such molding compounds can also contain crystal-clear polystyrene.

II. The modified polyphenylene ethers of the present invention, when combined with polyamides, produce products that likewise have distinctly better mechanical properties than those based on unmodified polyphenylene ethers.

Suitable polyamides are homopolymers and copolymers that preferably have an exclusively aliphatic structure. In particular, reference is made here to the 6-, 4,6-, 6,6-, 6,12-, 10,10-, b 10,12-, 11-, 12-, and 12,12-polyamides. The identification of these polyamides conforms to the international standard, with the first number(s) indicating the number of carbon atoms in the starting amine and the last number(s) indicating the number of carbon atoms in the dicarboxylic acid. If only one number is given, this means that the starting material is an aminocarboxylic acid or its lactam (H. Dominghaus, "Plastics and Their Properties", VDI Verlag, 1976, page 272). However, mixed aliphatic-aromatic copolyamides are also suitable (see, e.g., U.S. Pat. Nos. 2,071,250, 2,071,251, 2,130,523, 2,130,948, 2,241,322, 2,312,966, 2,512,606, and 3,393,210; Kirk-Othmer, Encyclopedia of Chemical Technology, Vol. 18, John Wiley & Sons (1982), pages 328 and 435). The number-average molecular weight of the polyamides should be over 5,000, preferably over 10,000.

Naturally, other components can be used in addition, such as impact-strength modifiers, which are preferably functionalized in accordance with the state of the art, for example with maleic anhydride or fumaric esters.

Furthermore, the mechanical properties can be improved even further when functionalized phenols such as those described in EP-OS 0 338 209 and the unpublished German Patent Applications P 39 10 825.2 and P 39 10 832.5, corresponding to U.S. patent application Ser. Nos. 07/476,690 and 07/477,457, respectively, are incorporated during the oxidative coupling in addition to the phenols of Formulae I and II.

III. When functionalizing the modified polyphenylene ethers of the present invention with, e.g., maleic anhydride by conventional methods (in addition to the publications already mentioned, for example, also refer to WO 85/05 372, WO 86/02 086, and the unpublished German Patent Application P 38 34 912.4, corresponding to U.S. patent application Ser. No. 07/394,061), followed by blending with polyamides, molding compounds are obtained whose mechanical properties are superior to those based on unmodified polyphenylene ethers. Apparently, functionalizing is facilitated by the incorporated comonomers II.

IV. Naturally, a functionalized impact-strength modifier (see under I.) can also be mixed with the modified polyphenylene ether, and the compounds obtained can be mixed with a polyamide, although this method is less preferred.

V. More advantageously, than as described under IV., a modified polyphenylene ether is mixed with an impact-strength modifier as under I., the mixture is functionalized in a known way, for example with maleic anhydride, optionally together with other substances with synergistic action, and the blend is then mixed with a polyamide.

Suitable amounts for the present PPE and the other polymer in the above-discussed blends (I. to V.) range from 0.1 to 99.9% by weight of the PPE and 99.9 to 0.1% by weight of the other polymer, preferably 1 to 99% by weight of the PPE and 99 to 1% by weight of the other polymer, most preferably 5 to 95% by weight of the PPE and 95 to 5% weight of the other polymer, although these values are not intended to limit the present invention.

The combination of modified polyphenylene ethers with the other polymers can be carried out by any method conforming to the state of the art. They can either be mixed when dissolved in solutions followed by concentration and extrusion under degassing conditions; however, the combination of modified polyphenylene ethers with the other polymers is usually carried out starting from a dry blend in an efficient kneading unit, for example a double-screw extruder, at temperatures of about 250° to 350° C., preferably 260° to 310° C. When admixtures have to be made in multiple succession, (e.g., see III., IV., and V.) either a premold compound can be prepared that is then blended further, or preferably in a single-step operation, the other polymers can be introduced into the melt of the premix by intermediate feeding.

The thermoplastic compounds of the present invention can also contain flameproofing agents or other additives such as pigments, oligomers and polymers, antistatic agents, stabilizers, and processing aids as well as reinforcing agents. The proportion of reinforcing agents can be up to 50% by weight, that of the flameproofing agents up to 15% by weight, and that of all other additives combined up to 5% by weight, each based on the total weight of the molding compound.

Suitable flameproofing agents, in particular, are aromatic phosphorus compounds such as triphenylphosphine oxide and triphenyl phosphate. A conventional halogenated flameproofing agent can also be used. Organic compounds containing halogen are suitable for this purpose, such as those described, for example, in the monograph by H. Vogel "Flameproofing of Plastic", Hüthig-Verlag, 1966, on pages 94 to 102. However, halogenated polymers, for example, halogenated polyphenylene ethers (see DE-OS 33 34 068) or brominated oligostyrenes or polystyrenes, can also be used for this. The compounds should contain more than 30 wt. % halogen.

When halogenated flameproofing agents are used, it is recommended that a synergist be used. Compounds of antimony, boron, and tin are suitable synergists. These are usually used in amounts of 0.5 to 10 wt. % based on the weight of the thermoplastic compounds.

Suitable reinforcing agents, in particular, are glass and carbon fibers.

Suitable stabilizers include organic phosphites, for example, didecylphenyl phosphite and trilauryl phosphite, sterically hindered phenols, and tetramethylpiperidine derivatives, benzophenone derivatives, and triazole derivatives.

Suitable processing aids are waxes such as oxidized hydrocarbons and their alkali metal and alkaline earth metal salts.

The molding compounds obtained can be processed into shaped objects by conventional processes for processing thermoplastics, for example by injection molding and extrusion.

Examples of technical applications of the present molding compounds are pipes, panels, cases, and other industrial items for the automobile, electric, and precision mechanics sector.

The molding compounds of the present invention are distinguished from conventional products by possessing high toughness with good high-temperature dimensional stability.

Other features of the invention will become apparent in the course of the following descriptions of exemplary embodiments which are given for illustration of the invention and are not intended to be limiting thereof.

EXAMPLES

In the examples, the reported properties were measured as follows.

The viscosity number (J) of the polyphenylene ether was measured by the method of DIN 53 728 at 25° C. in chloroform (concentration 5 g/l) in cm$^3$/g.

The relative viscosity, $\eta_{rel}$, of the polyamide was determined with a Ubbelohde Viscometer at 25° C. in m-cresol (concentration 5 g/l).

The elongation at failure ($\epsilon_R$) was determined by the method of DIN 53 455 on dumbbell-shaped test pieces injection-molded at 290° C.

To measure the notched impact strength $a_k$, by the method of DIN 53 453 at 23° C., small standard test pieces injection-moldedat 290° C. with rectangular notches were used.

Preparation of modified polyphenylene ethers

Example 1.1

A solution of 18.0 kg of 2,6-dimethylphenol (99 mole %) and 0.408 kg of 2,6-dibenzylphenol (1 mole %) in 18 kg of toluene is added over a period of 30 minutes while passing air through the mixture to a stirred mixture temperature-controlled at 30° C. of 156.0 kg of toluene, 23.64 kg of methanol, 3.6 kg of di-n-butylamine, 182.4 g of CuCl$_2$.H$_2$O, and 182.4 g of N,N'-di-t-butylethylenediamine. The mixture is allowed to react for 70 minutes and the reaction is then terminated by adding 51 liters of water and 996 g of the disodium salt of ethylenediamine-N,N,N',N'-tetraacetic acid.

After separating the phases and washing twice at 80° C., each time with a mixture of 60 liters of water and 180 g of triethanolamine, the product is precipitated with 200 kg of methanol, washed twice with 100 kg portions of methanol, and then dried.

Yield: 16.8 kg.
J: 52 cm$^3$/g.

Example 1.2

The procedure was the same as in Example 1.1 with the exception of using a mixture of 18 kg of 2,6-dimethylphenol (95 mole %) and 2.128 kg of 2,6-dibenzylphenol (5 mole %) in 18 kg of toluene.

Yield: 16.6 kg.
J: 53 cm$^3$/g

Example 1.3

The procedure was the same as in Example 1.1 with the exception of using a mixture of 15 kg of 2,6-dimethylphenol (90 mole %) and 3.743 kg of 2,6-dibenzylphenol (10 mole %) in 18 kg of toluene.

Yield: 16.4 kg.
J: 49 cm$^3$/g.

Example 1.4

30 kg of 2,6-dimethylphenol (99 mole %) and 0.493 kg of 2-benzyl-6-methylphenol (1 mole %) in 30 kg of toluene is added over a period of 30 minutes while passing air through the mixture to a stirred mixture of 260 kg of toluene, 42.0 kg of methanol, 6.0 kg of morpholine, 153 g of CuCl$_2$.2H$_2$O (dissolved in 850 g of methanol), and 153 g of N,N'-di-t-butylethylenediamine. After a reaction time of 135 minutes, the reaction is terminated by adding a mixture of 75 kg of water, 9 kg of methanol, and 300 g of triethanolamine and passing CO$_2$ through the mixture. The organic phase is washed twice, each time with 125 kg of water and 300 g of triethanolamine at 80° C. The product is precipitated with 350 kg of methanol, washed twice with 180 kg portions of methanol, and then dried.

Yield: 25.8 kg.
J: 54 cm$^3$/g.

Example 1.5

The procedure was the same as in Example 1.4 with the exception of using 30 kg of 2,6-dimethylphenol (100 mole %) in 30 kg of toluene.

Yield: 25.4 kg.
J: 53 cm$^3$/g.

2. Preparation of molding compounds

The molding compounds are prepared on a Leistritz double-screw extruder with the model designation LSM 30.34. The granulated and dried products are injection-molded as standard specimens and then tested. The test results can be found in Table 1.

Example 2.1

5.4 kg of the polyphenylene ether from Example 1.4 is mixed in the melt at 290° C. with 0.6 kg of VESTE- NAMER ® 8012 (polyoctenylene from Hüls AG, D-4370 Marl, West Germany). The extruded strand is cooled in a water bath, and then granulated and dried.

Comparison Example A

The procedure was the same as in Example 2.1 with the exception of using 5.4 kg of polyphenylene ether from Example 1.5.

Example 2.2

5.4 kg of the polyphenylene ether from Example 1.1 is mixed in the melt at 280° C. with 0.6 kg of BUNA ® AP 437 (ethylene-propylene-diene terpolymer from Hüls AG, D-4370 Marl, West Germany).

Comparison Example B

The procedure was the same as in Example 2.2 with the exception that 5.4 kg of the polyphenylene ether from Example 1.5 was used.

Example 2.3

2.0 kg of the polyphenylene ether from Example 1.1 is mixed in the melt at 290° C. with 3.0 kg of polyamide 12 ($\eta_{rel}$=1.91).

Example 2.4

The procedure was the same as in Example 2.3 with the exception of using 2.0 kg of the polyphenylene ether from Example 1.2.

Example 2.5

The procedure was the same as in Example 2.3 with the exception of using 2.0 kg of the polyphenylene ether from Example 1.3.

Comparison Example C

The procedure was the same as in Example 2.3 with the exception of using 2.0 kg of the polyphenylene ether from Example 1.5.

Example 2.6

3.96 kg of the polyphenylene ether from Example 1.1 is premixed dry with 0.040 kg of maleic anhydride and extruded at 280° C., then granulated and dried.

2.0 kg of the functionalized polyphenylene ether thus prepared is mixed in the melt at 290° C. with 3.0 kg of polyamide 12 ($\eta_{rel}$=1.91).

Comparison Example D

The procedure was the same as in Example 2.6 with the exception of using 3.96 kg of the polyphenylene ether from Example 1.5.

Example 2.7

As in Example 2.1, a premold compound is prepared from 4.5 kg of the polyphenylene ether from Example 1.1 and 0.5 kg of VESTENAMER ® 8012.

3.96 kg of this premold compound is mixed with 0.040 kg of maleic anhydride and melted in a double-screw extruder, while 6.0 kg of polyamide 12 is added as a granulate in the 5th section and mixed in at 290° C. The extruded strand is cooled in a water bath, and then granulated and dried.

Comparison Example E

The procedure was the same as in Example 2.7 with the exception of using 4.5 kg of the polyphenylene ether from Example 1.5.

The results for the Examples and Comparison Examples are given in Table 1. As seen in Table 1, improved notched impact strength is obtained in all cases when using the modified polyphenylene ether of the present invention. In addition, the elongation at failure is regularly greater than with the corresponding molding compound based on unmodified polyphenylene ether, which indicates improved phase bonding. Surprisingly, however, the flowability is not impaired by this in most cases.

TABLE 1

| Example | Polyphenylene ether (wt. %) | Polyoctenylene (wt. %) | EDPM rubber (wt. %) | MA[a] (wt. %) | Polyamide 12 (wt. %) | Notched impact (DIN 53 453; kJ/m$^2$) | Elongation at failure (%) |
| --- | --- | --- | --- | --- | --- | --- | --- |
| 2.1 | 90 | 10 | — | — | — | 36 | * |
| A | 90 | 10 | — | — | — | 29 | * |
| 2.2 | 90 | — | 10 | — | — | 18 | * |
| B | 90 | — | 10 | — | — | 13.5 | * |
| 2.3 | 40 | — | — | — | 60 | 6 | 34 |
| 2.4 | 40 | — | — | — | 60 | 6 | 48 |
| 2.5 | 40 | — | — | — | 60 | 7 | 56 |
| C | 40 | — | — | — | 60 | 4 | 5 |
| 2.6 | 39.6 | — | — | 0.4 | 60 | 9 | 91 |
| D | 39.6 | — | — | 0.4 | 60 | 7 | 63 |
| 2.7 | 35.64 | 3.96 | — | 0.4 | 60 | o.Br.[b] | 151 |
| E | 35.64 | 3.96 | — | 0.4 | 60 | 30 | 102 |

[a]Maleic anhydride.
[b]No failure.
*Not determined.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A molding thermoplastic, comprising a polyphenylene ether, wherein said polyphenylene ether is prepared by oxidative coupling of a phenol of the formula I,

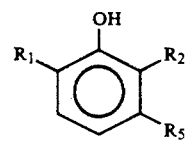

wherein $R_1$ and $R_2$ are alkyl with 1 to 6 carbon atoms or phenyl, or $R_1$ is t-butyl and $R_2$ is H, and $R_5$ is alkyl with 1 to 6 carbon atoms or H; with a comonomer of the formula II,

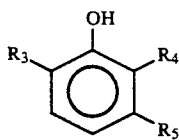

wherein $R_3$ is the same as $R_1$ or substituted or unsubstituted benzyl, and $R_4$ is substituted or unsubstituted benzyl, and wherein said substituted or unsubstituted benzyl has 7 to 12 carbon atoms.

2. The molding thermoplastic of claim 1, wherein 0.2–20 mol % of said comonomer of formula II, based on the total amount of said phenol of formula I and said comonomer of formula II, is coupled with said phenol of formula I.

3. The molding thermoplastic of claim 1, wherein $R_1$ and $R_2$ are both $CH_3$.

4. The molding thermoplastic of claim 1, wherein $R_5$ is H.

5. A molded object prepared from a molding thermoplastic comprising a polyphenylene ether, wherein said polyphenylene ether is prepared by oxidative coupling of a phenol of the formula I,

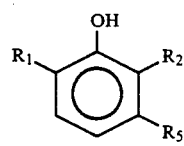

wherein $R_1$ and $R_2$ are alkyl with 1 to 6 carbon atoms or phenyl, or $R_1$ is t-butyl and $R_2$ is H, and $R_5$ is alkyl with 1 to 6 carbon atoms or H, with a comonomer of the formula II,

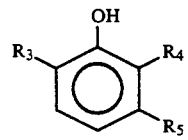

wherein $R_3$ is the same as $R_1$ or substituted or unsubstituted benzyl, and $R_4$ is substituted or unsubstituted benzyl, and wherein said substituted or unsubstituted benzyl has 7 to 12 carbon atoms.

6. The molded object of claim 5, wherein 0.2–20 mol% of said comonomer of formula II, based on the total amount of said phenol of formula I and said comonomer of formula II, is coupled with said phenol of formula I.

7. The molded object of claim 5, wherein $R_1$ and $R_2$ are both $CH_3$.

8. The molded object of claim 5, wherein $R_5$ is H.

* * * * *